*INVENTOR.*
GILBERT B. LARSON
BY FRANK A. KAMAN

ATTORNEY

Jan. 1, 1952   G. B. LARSON ET AL   2,581,033
AXIALLY OFFSET, MOTOR OPERATED, IMPACT-TYPE WRENCH
Filed Feb. 14, 1947   2 SHEETS—SHEET 2

*INVENTOR.*
GILBERT B. LARSON
BY FRANK A. KAMAN

ATTORNEY

Patented Jan. 1, 1952

2,581,033

UNITED STATES PATENT OFFICE 2,581,033

AXIALLY OFFSET, MOTOR OPERATED, IMPACT-TYPE WRENCH

Gilbert B. Larson, Geneva, and Frank A. Kaman, Aurora, Ill., assignors to Independent Pneumatic Tool Company, Chicago, Ill., a corporation of Delaware Application February 14, 1947, Serial No. 728,552

3 Claims. (Cl. 81—52.3)

This invention relates to improvements in portable power operated impact tools for driving nuts and bolts by power.

The main object and purpose of our invention is to provide an improved angular driving connection between the motor and the impact units of the tool, whereby the impact unit, which engages and operates upon the work, may have its operative axis angularly disposed, for example, at right angles to, the motor axis of the tool, for reaching nuts and bolts not accessible to the type of tool having its motor and impact units arranged in alignment lengthwise of the tool.

A further object of our invention is to employ yieldable means between the motor unit and the work engaging member of the tool to relieve the teeth of the bevel gears of the angular drive against breakage and severance by the severe blows required of the impact unit to tighten the nuts and bolts at a tension in excess of the cross-sectional area and strength of the gear teeth.

A further object of our invention is to utilize the cam-means of the impact unit which transmits the power of the motor unit to the impact unit as the yieldable means aforesaid to protect the gear teeth from early destruction and prolong the life and durability of the tool.

With our invention a bevel gear drive for such tools enlarges their field of usefulness, the angular drive of our invention being applied as an attachment to the motor unit part of the tool.

The invention consists further in the structural features and arrangement of parts hereinafter described and claimed.

As shown in the accompanying drawings—

Figure 1:
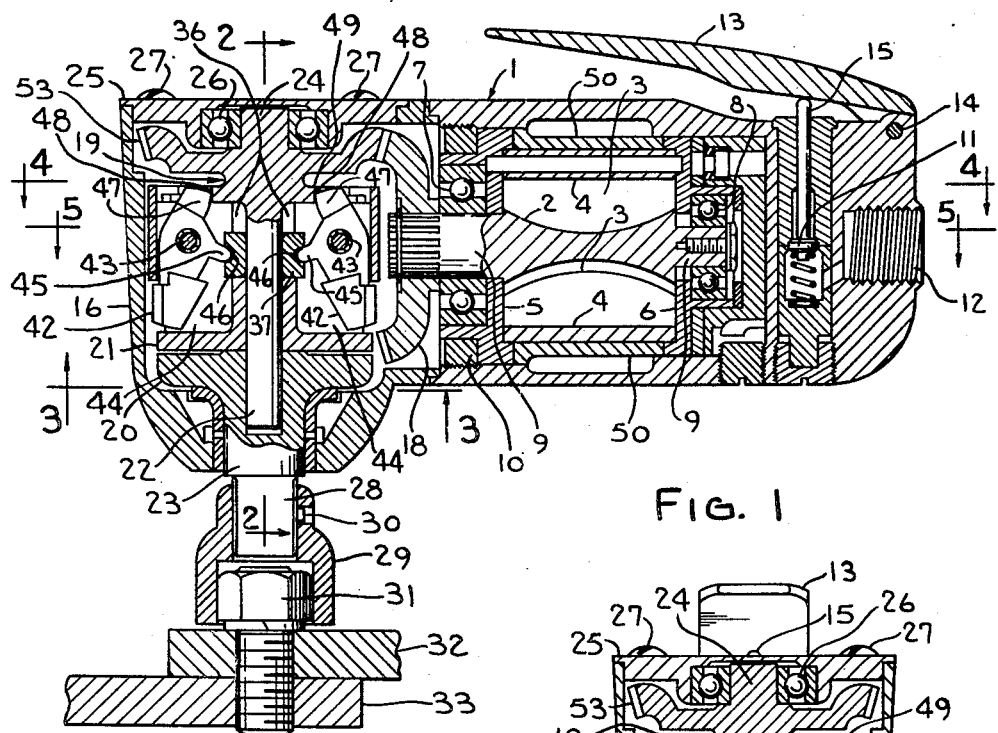
Fig. 1 is longitudinal sectional view through a portable power operated tool having a right angled impact wrench attachment or head in accordance with our invention.

As shown in the drawings, 1 indicates the support or outer casing of the tool. The support 1 mounts a motor unit which may be of the pressure fluid actuated rotary type having a rotor 2 provided with vanes or blades 3 working against the inner cylindrical surface of a cylinder bushing 4, as shown herein. The bushing 4 is fixed in the casing 1 against rotation and closed at its opposite ends by end plates 5, 6 as shown in Fig. 1.

The end plates 5, 6 support anti-friction bearing units 7, 8 to journal the trunnions 9, 9 at the opposite ends of the rotor 2. A ring nut 10 is screwed into the casing 1 against the front end plate 5 to clamp the motor unit in place.

The rotor 2 is eccentrically mounted in the cylinder bushing 4 to provide high and low pressure sides for the motor unit as usual in devices of this character. Pressure fluid or compressed air is admitted to and exhausted from the rotor chamber (not shown) provided by the cylinder bushing 4 to operate the rotor. The inlet valve 11 for the tool is spring biased towards closed position to normally close the supply of motive fluid to the motor unit 2 through a passage 12 in the rear end portion of the tool. The passage 12 is screw threaded to receive the nipple of a supply hose (not shown) for connecting it to the tool as well understood in this art.

The inlet valve 11 is opened or unseated by an operating lever 13 pivoted at 14 on the rear end of the tool support 1 and works against a stem 15 of the valve 11. It is understood that the tool has the desired porting system for handling the compressed air and supplying and exhausting it with respect to the tool motor for operating it. Furthermore, the tool support 1 is made small enough to be grasped by the hand of the operator and to actuate the handle lever 13 with comfort and ease. It will be noted that the lever 13 extends lengthwise along the tool case 1 for this purpose.

Secured to the front end of the motor case 1 which is made open for the purpose is the case 16 of the impact head or attachment. The latter is secured to the motor case 1 by a number of screws 17 as clearly shown in Fig. 8. The case 16 mounts the impact mechanism for the tool with its operative axis angularly disposed to or at right angles to the driving axis of the tool motor, the latter axis being represented by the trunnions 8 of the rotor 2. The forward trunnion 9 is splined as shown for mounting one of the beveled or mitered gears 18 in accordance with our invention.

The impact clutch unit 16 may be of the construction desired in keeping with the objects of our invention. Specifically, we employ an impact clutch unit of the design and operation disclosed and claimed in the co-pending application of Walter G. Mitchell and Louis P. Fosnot, Serial No. 660,348, filed April 8, 1946, now Patent No. 2,564,224, issued August 14, 1951, and assigned to the same assignee as the within present application. We have shown enough of said impact clutch unit herein to render clear and complete the disclosure of this instant application. In this light, we will describe generally the impact unit and its adaption to the angular drive of our invention for impact tools.

Journalled in the attachment case 16 for rotation about its axis at right angles to the motor is the impact clutch unit comprising a driving member 19, an anvil member 20, and an interposed hammer member 21, all relatively revoluble and maintained in axial alignment by a shaft 22 directly connected with and rotated by the driving member 19 as shown in Fig. 1.

The hammer member 21 is a solid cylindric body of the desired weight or mass and is rotatable about the shaft 22 which extends through the hammer member 21 and into a hollow spindle 23 on and depending from the anvil member 20. The spindle 23 journals the anvil member 20 in the attachment casing 16 below the motor axis, there being a trunnion 24 on the driving member 19 above the motor axis to journal the impact unit in the upper part of the casing 16. This part of the casing 16 comprises a detachable cover 25 which mounts on the inner side thereof an anti-friction bearing unit 26 for the trunnion 24. Screws 27 secure the cover in place.

The spindle 23 terminates exteriorly of the attachment case 16 in a non-circular section 28 to mount a bolt, nut or work engaging socket or member 29, the latter having releasable connection with the spindle by a spring biased detent pin 30 as indicated in Fig. 1. The nut or bolt to be driven by the tool is indicated by 31 and the overlapping plates or equivalent parts to be clamped together by 32, 33, respectively.

Figure 2:
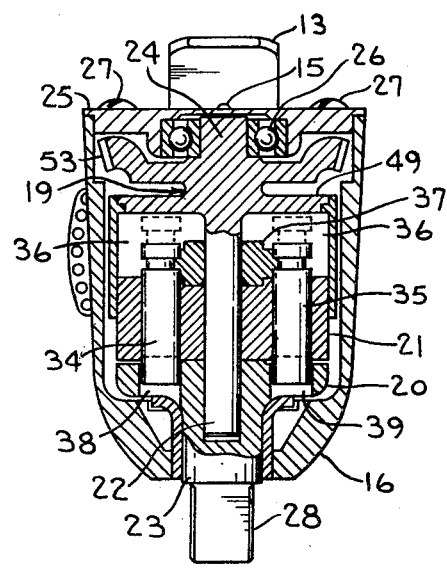
Fig. 2 is a transverse sectional view taken on line 2—2 showing the impact rods of the impact attachment.
Figure 3:
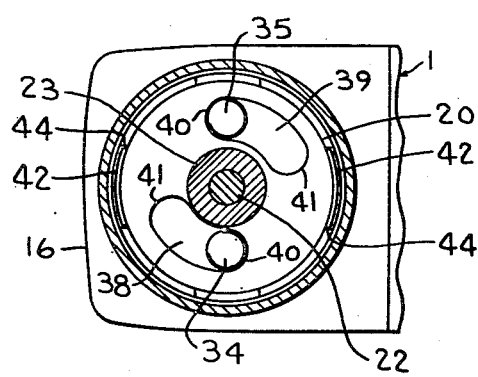
Fig. 3 is a cross-sectional view taken on line 3—3 of Fig. 1 to show the slots in the anvil member for said rods.
Figure 5:
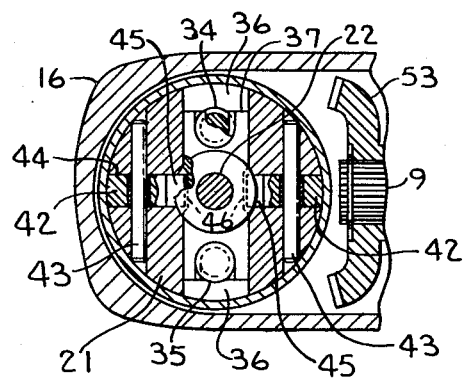
Fig. 5 is similar sectional view taken on line 5—5 of Fig. 1 with the motor section of the tool deleted for the purpose of the illustration.
Figure 6:
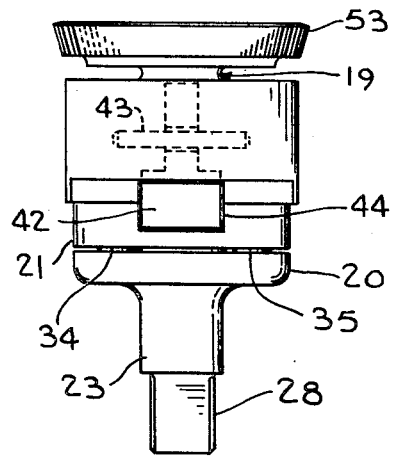
Fig. 6 is an assembly view of the impact unit and connected bevel gear removed from the tool.
Figure 7:
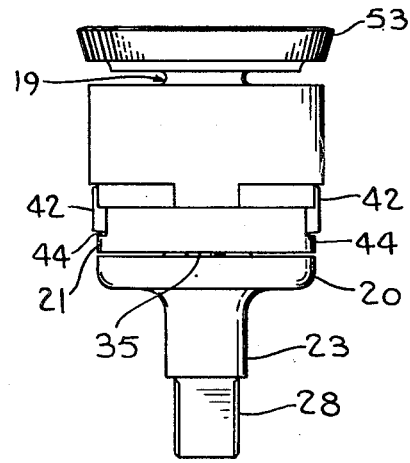
Fig. 7 is a similar view of the same unit and viewed at right angles to the view shown in Fig. 6.

The impact elements of the presently illustrated impact mechanism are in the form of a pair of parallel steel rods 34, 35 slidably mounted in the body of the hammer member 21 on opposite sides of the shaft 22 as shown in Fig. 2. The rods 34, 35 are mounted in bores in the hammer member 21 and extend at their upper ends into a cross-slot 36 in the hammer member 21 as shown in Figs. 2 and 5.

The rods 34, 35 are substantially of the same length and are connected together at the upper ends in the cross-slot 36 by a cross-bar 37 fitting in said slot and slidably mounted on the shaft 22 which extends across the slot.

The lower ends of the rods 34, 35 are projectable below the hammer member 21 into arcuate slots 38, 39 in the anvil member 20 on opposite sides of the shaft 22 as shown in Fig. 2. When the rods 34, 35 are in the slots 38, 39, the anvil member 20 is clutched to the driving member 19 for rotation by the tool motor when the rods engage the abutments 40, 41 at the closed ends of the slots. In this way, the nut or bolt 31 is set when free to turn by the tool motor and is tightened by the impacts of the rods 34, 35 against the abutments when the nut or bolt offers resistance to the driving torque of the machine. The slots 38, 39 are concentric to the axis of the shaft 22 and are disposed at different radial distances from said shaft so that each rod 34, 35 may enter its slot in only one rotative position of the hammer member 21 as more fully explained in said co-pending application. The tool motor is reversible so that the tool may drive the impact unit in reverse directions for tightening and loosening nuts or bolts, respectively.

Figure 4:
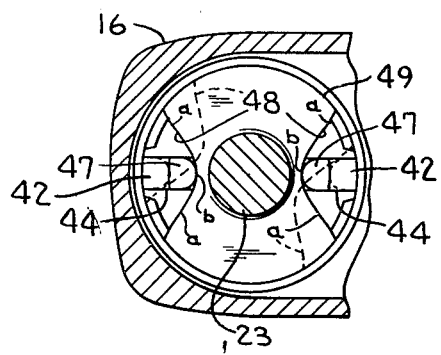
Fig. 4 is a fragmentary longitudinal sectional view taken on line 4—4 of Fig. 1 to show the cam-means of the impact mechanism through which the bevel gears of the right angle drive function in accordance with our invention.

The rods 34, 35 in the type of impact mechanism disclosed are moved into and out of clutching and declutching positions, respectively, by centrifugally responsive fly-weights 42, 42 and a cam-means, the latter being illustrated in Fig. 4. The fly-weights 42 are shown in Fig. 1 and are pivoted by pins 43 on the hammer member 21 on opposite sides of the shaft 22 in recesses 44 on opposite sides of and opening into the cross-slot 36 as shown in Fig. 5. The fly-weights 42 extend above the pins 43 and operatively engage the bar 37 to raise and lower it. For this purpose, the fly-weights have lugs 45 extending into grooves 46 in the bar 37 as shown in Figs. 1 and 5.

Each of the fly-weights 42 has a lug 47 extending into a peripherial recess 48 in the disc 49 which is integral with and rotated in unison with the driving member 19. Said recesses 48 have cam-edges $a, a$ of the desired contour which are more particularly described in said co-pending application and have center portions $b$ to permit the fly-weights 42 to respond to maximum extent to centrifugal force in the rotation of the hammer member 21 by the tool motor. Movement of weights 42 projects the rods 34, 35 into the slots 38, 39 as shown in Fig. 2. This either clutches the anvil member 20 to the power driven hammer and the driving members or imparts impact blows to the anvil member depending on whether the anvil member is free to turn or its rotation is arrested by the tightened bolt or nut. The cam-means 48 on the driving member 19 coacts with the lugs 47 on the fly-weights 42 to positively withdraw the rods 34, 35 out of the slots 38, 39 to declutch thhe clutch.

When the foregoing occurs, the driving member 19 accelerates under the motor drive and the rods 34, 35 re-enter the slots 38, 39 to impact against the ends of the slots to further tighten the nut or bolt as the case may be and this action repeats rapidly as long as the tool remains connected with the work. The disconnection is made when the nut or bolt is tightened to the desired tension or when the nut is loosened in a removing operation.

Figure 8:
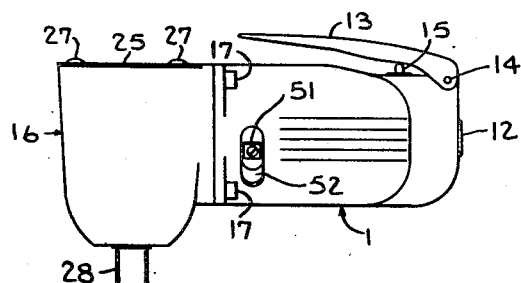
Fig. 8 is a side elevational view of the complete portable tool embodying the right angle drive of our invention, the view for illustrative purposes being on a smaller scale than used in the previous figures.

To control the direction of rotation of the tool motor 2, we provide a sleeve 50 rotatable about the cylinder bushing 4 as shown in Fig. 1. This sleeve 50 fits in with the porting arrangement of the tool motor and is turned by a knob or projection 51 fixed to the sleeve and accessible from the exterior of the tool through a slot 52 in the motor case 1 as shown in Fig. 8. With the knob at one end of the slot 52 the tool is adjusted for its motor 2 to rotate in a clock-wise direction. Setting the knob at the other end of the slot 52 conditions the motor 2 for rotation in a counter-clockwise direction.

In accordance with our invention, to rotate the impact unit from the tool motor we install a bevel gear 53 in the attachment head 16. This bevel gear 53 is rigidly fixed to and integral with the driving member 19.

The cam-means 47, 48 heretofore described provide yieldable means interposed between the motor unit 2 and the work engaging member 29 and the impact unit to relieve the bevel gears 18 and 53 of the blows of the impact unit on the work. This protects the teeth of said gears from the severe strains of the impact blows on the work and, hence, the possibility of early breakage of the gear teeth is avoided.

With our invention, the angular drive will withstand the severe strains required for nut and bolt tightening and loosening operations and the drive does not increase the overall length and the weight of the tool. This compactness, lightness of weight and increased durability represents a meritorious advance in this art.

The details of construction and arrangement of parts shown and described may be variously changed and modified without departing from the spirit and scope of our invention, except as pointed out in the annexed claims.

We claim as our invention:

1. A portable power operated tool of the character described, comprising a support, a motor unit mounted on the support with its driving axis extending longitudinally of the support, an impact clutch unit carried by the support with its operative axis angularly disposed to said motor axis, means providing an angular driving connection between said units, a work engaging member for the tool driven by said impact unit, and cam-means operably connected in the drive between the impact unit and the angular connection for transmitting the power of the motor unit to the impact unit, said cam-means being yieldable upon impact to permit continued rotation of said angular driving connection relative to said impact unit to relieve the angular driving connection of the direct blows of the impact unit on the work.

2. A portable power operated tool of the character described, comprising a support, a motor unit mounted on the support with its driving axis extending longitudinally of the support, an impact unit carried by the support and having a driving member with a disc having its operative axis angularly disposed to the motor axis, means providing an angular driving connection between said motor unit and said driving member, a work engaging member for the tool driven by said impact unit, and cam-means carried by the driving member at the peripherial portion of said disc for transmitting the power of the motor unit to the impact unit through said driving connection, said cam-means being yieldable upon impact to permit continued rotation of the motor unit and angular driving connection relative to the impacting unit to relieve the angular driving connection of the directing blows of the impact unit on the work.

3. A portable power operated tool of the character described, comprising a support, a motor unit mounted on the support with its driving axis extending longitudinally of the support, an impact clutch unit carried by the support, rotative driving cam means operably connected with and adapted to drive said clutch unit, a pair of intermeshing bevel gears providing an angular driving connection between said motor unit and said cam means, one of said gears being rigidly connected with said driving cam means and the other gear being connected to the motor unit, a work engaging member for the tool driven by the impact unit, and said cam means being yieldable upon impact of the unit against the work and permitting continued rotation of the driving cam means and said rigidly connected gear relative to the impact unit to relieve the teeth of said gears of the direct blows of the impact unit on the work.

GILBERT B. LARSON.
FRANK A. KAMAN.

REFERENCES CITED

The following references are of record in the file of this patent:

UNITED STATES PATENTS

| Number | Name | Date |
|---|---|---|
| 2,179,724 | Kuehne | Nov. 14, 1939 |
| 2,184,394 | Morretti | Dec. 26, 1939 |
| 2,219,865 | Fitch | Oct. 29, 1940 |
| 2,219,883 | Amtsberg | Oct. 29, 1940 |
| 2,326,347 | Forss | Aug. 10, 1943 |
| 2,341,497 | Amtsberg | Feb. 8, 1944 |
| 2,342,783 | Aron et al. | Feb. 29, 1944 |
| 2,425,793 | Fosnot | Aug. 19, 1947 |